US005531816A

United States Patent [19]
Wickramanayake

[11] Patent Number: 5,531,816
[45] Date of Patent: Jul. 2, 1996

[54] BLEED-ALLEVIATED, WATERFAST, PIGMENT-BASED INK-JET INK COMPOSITIONS

[75] Inventor: Palitha Wickramanayake, Corvallis, Oreg.

[73] Assignee: Hewlett-Packard Company, Palo Alto, Calif.

[21] Appl. No.: 528,077

[22] Filed: Sep. 14, 1995

[51] Int. Cl.⁶ .................................................. C09D 11/02
[52] U.S. Cl. ........................................ 106/20 R; 106/20 D
[58] Field of Search ................................ 106/20 R, 20 D

[56] References Cited

U.S. PATENT DOCUMENTS

| | | | |
|---|---|---|---|
| 5,106,416 | 4/1992 | Moffatt | 106/20 R |
| 5,116,409 | 5/1992 | Moffatt | 106/22 R |
| 5,133,803 | 7/1992 | Moffatt | 106/25 R |
| 5,181,045 | 1/1993 | Shields et al. | 346/1.1 |
| 5,198,023 | 3/1993 | Stoffel | 106/22 R |
| 5,226,957 | 7/1993 | Wickramanayake et al. | 106/26 R |

OTHER PUBLICATIONS

R. Lustenader, "Color Pigment Encapsulation", Ink World, pp. 74–75 (Jan./Feb. 1995).

Primary Examiner—Helene Klemanski

[57] ABSTRACT

Bleed control and fast dry times are achieved in pigment-based ink-jet ink compositions by formulating the ink compositions to include at least one appropriately modified pigment in a water-insoluble organic compound, which is microemulsified with an amphiphile and water. By employing a vehicle formulated in accordance with the invention, the present pigment-based ink-jet ink compositions are bleed-free and fast-drying and exhibit the inherent waterfastness of pigments. Moreover, the use of a modified pigment improves print quality by passivating the pigment particles to eliminate agglomerations between the particles and by providing pigment particles of substantially uniform size, thereby yielding more uniform thickness and coverage on a print medium. In short, pigment-based ink-jet ink compositions formulated in accordance with the invention offer the best qualities of pigments as colorants while reducing or eliminating the problems conventionally associated therewith.

22 Claims, 1 Drawing Sheet

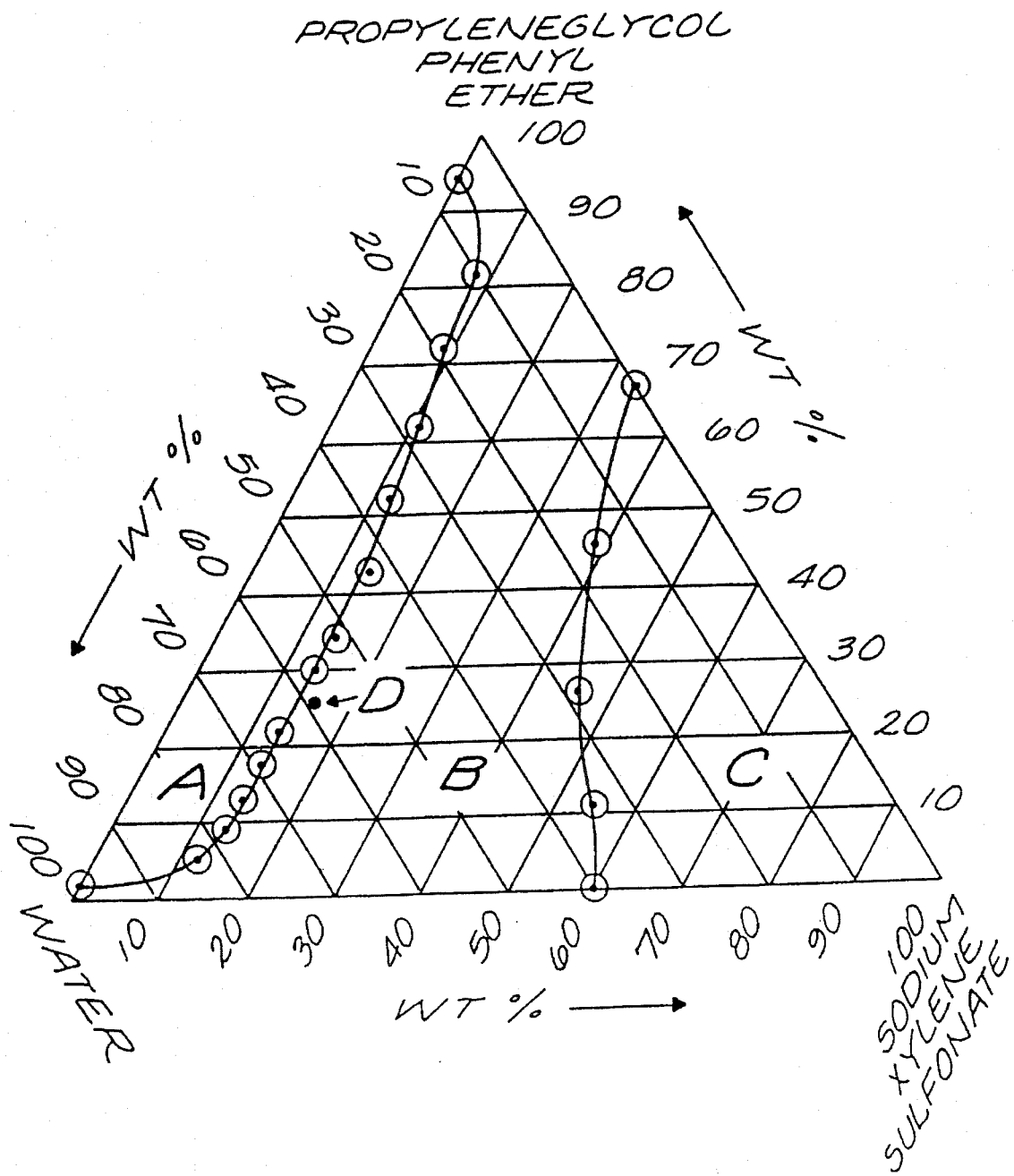

BLEED-ALLEVIATED, WATERFAST, PIGMENT-BASED INK-JET INK COMPOSITIONS

CROSS-REFERENCE TO RELATED APPLICATION

The present application is related to application Ser. No. 08/528,072, filed concurrently herewith [PD-10950441-1]. That application is directed to bleed control of dye-based thermal ink-jet compositions with retention of waterfastness.

TECHNICAL FIELD

The present invention relates to ink compositions employed in ink-jet printing and, more particularly, to the reduction of bleed, improvement of dry time, and retention of waterfastness in pigment-based ink-jet ink compositions.

BACKGROUND ART

Ink-jet printing is a non-impact printing process in which droplets of ink are deposited on print media, such as paper, transparency film, or textiles. Low cost and high quality of the output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two basic means currently available for achieving ink droplet ejection in ink-jet printing: thermally and piezoelectrically. In thermal ink-jet printing, the energy for drop ejection is generated by electrically heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Ink-jet inks are mostly available as dye-based compositions. However, a very limited number of pigment-based inks are also available. Indeed, only two black pigment-based inks are commercially available at the present time; no color pigment-based inks are commercially available. Pigments do offer two very desirable properties: waterfastness and lightfastness. However, they have not found extensive use in ink-jet ink compositions partly due to their natural tendency to agglomerate in aqueous (hydrophilic) media as well as their lack of uniform size distribution. Difficulties in unheated bleed control constitute another reason pigment-based ink-jet inks are not extensively used.

The agglomeration of pigment particles and their size variability can result in poor print quality and reliability. In response to these problems, technology has been developed to encapsulate pigments in transparent polymer materials to render the pigment particles passive, thereby eliminating agglomeration. Moreover, the process of encapsulating the pigment particles also ensures a narrow size distribution thereof, so that variability in the thickness of the printed ink is reduced. The technology of encapsulating pigment particles is described in an article entitled "Color Pigment Encapsulation", written by Robert Lustenader (Ink World, January/February, 1995, pages 74–75). The technology of dispersing pigments in solvents with hydrophobic dispersants is also readily available. Surface modifications not involving either encapsulants or dispersants that render the pigment surface appropriate for suspension in solvents are also known.

While the agglomeration and size distribution problems associated with pigments have been addressed, the inherent waterfastness of the pigments has meanwhile often been sacrificed in the formulation of pigment-based ink compositions. More specifically, pigments are typically dispersed in aqueous media to form ink-jet ink compositions using water-soluble dispersants, thereby often losing their inherent waterfastness in the process. Thus, by dispersing pigments in aqueous media, one of the most advantageous features of pigments can be destroyed. Moreover, the dispersion of pigments in aqueous media renders pigment-based ink compositions subject to bleed—a problem that has not been overcome to date.

With regard to the problem of bleed, pigment-based inks formulated as dispersions in aqueous media exhibit bleed when printed adjacent to other aqueous ink compositions, whether dye-based or pigment-based. The term "bleed", as used herein, is defined to be the invasion of one color into another, as evidenced by a ragged border therebetween. Bleed occurs as colors mix both on the surface of the paper substrate as well as within the substrate itself. Bleed is particularly problematic in ink-jet color printing given that aqueous yellow, cyan, and magenta ink compositions are printed in various proportions and combinations adjacent to one another and to black ink. To achieve superior print quality, it is necessary to have borders between colors that are bleed-free.

Various solutions to the problem of black to color and color to color bleed have been proffered. Some solutions involve changing the ink environment to reduce bleed. For instance, heated platens and other heat sources, along with specially-formulated paper, have been employed to reduce bleed. However, heated platens add cost to the printer, and specially formulated paper is more expensive than "plain" paper. Thus, using external paraphernalia to reduce bleed in ink-jet color printing is generally not cost effective.

Other proposed solutions involve changing the composition of an ink-jet ink to reduce bleed. For example, surfactants have been effectively used to reduce bleed in dye-based ink formulations; see, e.g., U.S. Pat. No. 5,106,416 entitled "Bleed Alleviation Using Zwitterionic Surfactants and Cationic Dyes", issued to John Moffatt et al; U.S. Pat. No. 5,116,409 entitled "Bleed Alleviation in Ink-Jet Inks", issued to John Moffatt; and U.S. Pat. No. 5,133,803 entitled "High Molecular Weight Colloids Which Control Bleed", issued to John Moffatt, all assigned to the same assignee as the present application. However, surfactants increase the penetration rate of the ink into the paper, which may also result in the reduction of edge acuity. Other solutions specific to dye-based ink compositions, disclosed in patents assigned to the present assignee, are found in U.S. Pat. No. 5,198,023, entitled "Cationic Dyes with Added Multi-Valent Cations to Reduce Bleed in Thermal Ink-Jet Inks", issued to John Stoffel, and U.S. Pat. No. 5,181,045, entitled "Bleed Alleviation Using pH-Sensitive Dyes", issued to James Shields et al, both assigned to the same assignee as the present application.

While the problem of black to color and color to color bleed has been the subject of much study, none of the solutions offered are applicable to pigment-based ink compositions, save for the use of heated platens that are not cost effective. For example, surfactants, if added in concentrations similar to those used in dye-based formulations to achieve bleed control, would destabilize the pigment dispersions made with water soluble dispersants. This is because the dispersants, themselves being surface active compounds, would be competitively displaced by the added surfactants that compete to attach to the pigment surface.

Additionally, ink formulations with improved dry times are always sought in ink-jet printing in order to gain in throughput.

Accordingly, a need exists for pigment-based inks exhibiting reduced bleed and improved dry times while retaining the inherent waterfastness of the pigment itself.

DISCLOSURE OF INVENTION

In accordance with the invention, a pigment-based ink-jet ink composition is provided which employs deagglomerated pigment particles in a vehicle that is fast drying and that reduces bleed without sacrificing the inherent waterfastness of the pigment. The deagglomeration of the pigment particles may be achieved by such means as encapsulation with a polymer, dispersion with a hydrophobic dispersant, or surface modification. The pigment-based ink composition of the present invention more specifically comprises:

(a) at least one deagglomerated pigment;

(b) at least one water-insoluble organic compound;

(c) at least one amphiphile; and (d) water, wherein the amphiphile is present in an amount sufficient to solubilize the organic compound in the water. Thus, the present pigment-based ink composition retains the waterfastness quality inherent in pigments; overcomes problems with agglomeration and size variability inherent in pigments; dries fast; and reduces bleed in a cost efficient manner.

A method of reducing bleed in ink-jet printing is thereby provided which involves formulating the above-described pigment-based ink and printing the same onto a print medium. Since typical color ink-jet printers employ an ink set having three color inks and a single black ink, it is contemplated that any or all of the four inks may be formulated according to the present invention to achieve high quality printing with reduced bleed. Preferably all four inks in a set of ink-jet inks would be formulated in accordance with the invention, such that the print quality optimally benefits from waterfastness, dry time, bleed control, and uniformity of coverage and thickness.

The ink composition and method of the invention may be used with a variety of ink-jet printers such as continuous, piezoelectric drop-on-demand printers and thermal or bubble jet drop-on-demand printers. Printing may be done on a variety of media; examples include paper, textiles, and transparencies. The reduction of bleed and the reclamation of the inherent waterfastness of pigments in pigment-based inks achieved in the practice of the invention enable ink-jet printers to effect high print quality in a cost-effective manner.

BRIEF DESCRIPTION OF THE DRAWINGS

The sole FIGURE is a ternary phase diagram showing the composition region of use for ink-jet ink compositions having a particular combination of organic compound, amphiphile, and water.

BEST MODES FOR CARRYING OUT THE INVENTION

Ink-jet inks formulated in accordance with the present invention improve ink-jet print quality by capitalizing on the inherent waterfastness of pigments while exhibiting reduced bleed and improved dry times. Moreover, the present inks benefit from the technologies whereby pigments are either encapsulated, dispersed, or surface-modified to be compatible with the water-insoluble organic compound of choice. Inks formulated in accordance with the invention may be printed by an ink-jet printer onto various forms of print media, including paper, transparencies, and textiles.

The waterfastness of pigments is retained by formulating the ink in a microemulsion, where the pigment is dispersed in a water-insoluble organic compound rather than water, with the microemulsion also serving to control bleed. More specifically, the present pigment-based ink composition is in the form of a microemulsion comprising (a) at least one deagglomerated pigment; (2) at least one water-insoluble organic compound; (3) at least one amphiphile; and (4) water, with the amphiphile being present in an amount sufficient to solubilize the water-insoluble organic component. All concentrations herein are in weight percent, unless otherwise indicated. The purity of all components is that employed in normal commercial practice for ink-jet inks.

The pigment component of the present inks is deagglomerated so that the present ink compositions exhibit greater uniformity in print quality. Pigment particles tend to agglomerate because their outer surfaces create natural forces of attraction between the particles. The agglomeration of pigment particles adversely affects print quality, causing print density variations, mottling, and reliability issues. Deagglomeration of pigment particles may be achieved in the practice of the invention by such known means as encapsulation of the pigment particles in a polymer; dispersion of the pigment particles with a dispersing agent; and surface modification of the pigment particles.

Therefore, in one embodiment of the present ink compositions, the pigment component is encapsulated in a hydrophobic material, specifically polymeric material, such as described in an article entitled "Color Pigment Encapsulation" written by Robert Lustenader (Ink World, January/February, 1995, pages 74–78. Specifically, this technology involves sealing the pigment particles in a transparent polymer such that the pigment particles are rendered passive and agglomeration problems are eliminated. Moreover, the sizes of the pigment particles are rendered more uniform. Any pigment that can be successfully encapsulated according to this process may be suitably employed in the practice of the invention. For example, any of the commercial dry and presscake pigments disclosed in U.S. Pat. No. 5,085,698 may be encapsulated and employed in the practice of the invention.

The particle size of the pigments is an important consideration in ink-jet printing, since the pigment particles must be sufficiently small to permit free flow of the ink through the ink-jet printing devices. For example, the ejecting nozzles of thermal ink-jet office printers typically have diameters on the order of about 10 to 60 µm. The particle size of the pigments is also an important consideration in achieving stability of the pigment dispersion as well as color strength and gloss. Given these considerations, the range of useful particle size is about 0.005 to 15 µm. Preferably, the pigment particle size should range from about 0.005 to 5 µm and, more preferably, from about 0.005 to 1 µm. Most preferably, the pigment particle size ranges from about 0.005 to 0.3 μm. However, in non-office applications, larger pigment particle sizes may be employed.

The pigment may represent up to about 30 wt % of the ink composition, but should generally range from about 0.1 to 15 wt %. Preferably, the pigment represents about 0.1 to 8 wt % of the ink composition.

In the practice of the invention, the pigment is dispersed in the water-insoluble organic compound, or mixture thereof, and is kept in "solution" in the form of a microemulsion. Microemulsions, which may be defined as thermodynamically stable isotropic "solutions" of water, oil (the insoluble compound), and surfactant, have been used to solubilize water-insoluble compounds. The function of the water is to provide a continuous phase for the microemulsion droplets. The organic compound resides primarily in the microemulsion droplets, namely, the discontinuous phase. The surfactant is an amphipathic, surface active species which is primarily responsible for the formation of microemulsion droplets.

The water-insoluble organic component serves several purposes in the practice of the invention. First, it serves as a primary solvent for the pigment particles, which are modified to be dispersed in a hydrophobic medium. Second, it serves as a co-solvent such as commonly employed in ink-jet printing. More particularly, when the pen of the ink-jet printer idles and is exposed to the atmosphere, the water in the ink vehicle evaporates. The presence of this co-solvent in the ink vehicle prevents crust formation and nozzle clogging. Hence, the vapor pressure of the organic compound should be sufficiently low in comparison to that of water that it does not evaporate during the normal operation of ink-jet printing.

Examples of water-insoluble organic compounds that may be suitably employed in the practice of the invention include, but are not limited to, water-insoluble mono- or polyglycol ethers; water-insoluble mono- or polyglycol phenyl ethers; water-in-soluble N-substituted 2-pyrrolidones; mono- or polyglycol esters; and water-insoluble hydrocarbons. In general, any water-insoluble organic compound, or combination thereof, may be employed in the practice of the invention so long as it is capable of stably containing the selected pigments in the microemulsion and so long as it may be solubilized by an amphiphile. Specific examples of water-insoluble organic compounds that are preferably employed in the practice of the invention include, but are not limited to: (1) ethylene, propylene, polyethylene, and polypropylene glycol phenyl ethers; and (2) ethylene, propylene, polyethylene, and polypropylene glycol esters such as acrylates. Additionally, specific examples of preferably-employed hydrocarbons include toluene, xylenes, naphthalene, and phenanthrene. Ethylene glycol phenyl ether and propylene glycol phenyl ether are most preferably employed in the practice of the invention. The water-insoluble organic component may range in concentration from about 1 to 70 wt % of the ink-jet ink composition.

The amphiphile employed in the practice of the invention may be any amphiphile that yields a microemulsion with the water-insoluble organic compound and water. Suitable amphiphiles solubilize the water-insoluble organic compound in water by breaking the compound into very small droplets and maintaining these droplets in a microemulsion. For example, amine oxides, such as N,N-dimethyl-N-dodecyl amine oxide (NDAO), may be suitably employed in the practice of the invention. Other examples of amine oxides suitably employed as amphiphiles include, but are not limited to, N,N-dimethyl-N-tetradecyl amine oxide (NTAO); N,N-dimethyl-N-hexadecyl amine oxide (NHAO); N,N-dimethyl-N-octadecyl amine oxide (NOAO); and N,N-dimethyl-N-(Z-9-octa-decenyl)-N-amine oxide (OOAO). Further examples of amphiphiles include alkyl sulfonates and alkyl benzene sulfonates.

The proper amount of amphiphile in the ink-jet ink composition is that amount that solubilizes the water-insoluble organic compound. It is noted that a mixture of amphiphiles may be employed in the practice of the invention. The determination of a given amphiphile and its concentration is considered not to constitute undue experimentation in view of the teachings of this invention.

Preferably, a class of amphiphiles termed "hydrotropic amphiphiles" is employed in the practice of the invention. Hydrotropic amphiphiles, like other surfactants in general, serve to solubilize the insoluble organic component in the ink composition. However, hydrotropic amphiphiles do not result in the precipitous drop in surface tension associated with the use of other surfactants, such that the reduction in surface tension for inks employing hydrotropic amphiphiles in the practice of the invention is curbed in comparison. In contrast, the steep drop in surface tension caused by the incorporation of other surfactants into ink-jet inks is known to cause puddles on the nozzle plates of the printhead, thereby negatively affecting drop ejection characteristics. Moreover, these other surfactants increase the penetration rate of the ink into the paper to such a degree that edge acuity may be affected. Thus, hydrotropic amphiphiles serve to solubilize the water-insoluble organic compound without the attendant degree of puddling on the nozzle plate or the loss of edge acuity that generally plague inks containing other surfactants. However, in situations where edge acuity is not critical, such as textile printing, surfactants other than hydrotropic amphiphiles may be used. Hydrotropic amphiphiles are preferred where edge acuity is critical, such as printing on paper.

The hydrotropic amphiphile may be anionic, cationic, or non-ionic in nature. Examples of anionic hydrotropic amphiphiles suitably employed in the practice of the invention include, but are not limited to, sodium benzoate, sodium salicylate, sodium benzene sulfonate, sodium benzene disulfonate, sodium toluene sulfonate, sodium xylene sulfonate, sodium cumene sulfonate, sodium cymene sulfonate, and sodium cinnamate. Examples of cationic hydrotropic amphiphiles suitably employed in the practice of the invention include, but are not limited to, para amino benzoic acid hydrochloride, procaine hydrochloride, and caffeine. Examples of non-ionic hydrotropic amphiphiles suitably employed in the practice of the invention include, but are not limited to, resorcinol and pyrogallol.

Optionally, a co-surfactant may be added to the present ink-jet ink compositions. Examples of suitably-employed co-surfactants include, but are not limited to, lactams such as 2-pyrrolidone; glycol esters such as propylene glycol laurate; mono- and di-glycol ethers, including ethylene glycol monobutyl ether, diethylene glycol ethers, diethylene glycol mono ethyl, butyl, hexyl ethers, propylene glycol ether, dipropylene glycol ether, and triethylene glycol ether; mid-chain alcohols such as butyl alcohol, pentyl alcohol, and monologous alcohols; and acetylenic polyethylene oxides. Preferably, if a co-surfactant is employed, the co-surfactant comprises a mid-chain alcohol, having from 3 to 8 carbon atoms, such as iso-propanol and pentanol. The co-surfactant may represent up to 10 wt % of the ink composition, either serving as a separate component or as a partial replacement for the amphiphile.

Consistent with the requirements for this invention, various types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEL (ICI America). Additionally, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The amount of amphiphile appropriately employed in a particular pigment-based ink composition may be determined in one of two ways, namely by an abbreviated method or a more systematic method. In the abbreviated method, one must first combine the organic compound(s) and the water in a ratio that reflects the desired final composition of the ink. The resulting two-phase liquid is thereafter titrated with the selected amphiphile(s) until a clear solution is obtained, representing the solubilization of the organic compound such that a single-phase solution is achieved. About 1% excess amphiphile may optionally be added to ensure a stable solution. Thus, the appropriate relational concentrations of the organic compound(s), water, and amphiphile(s) are determined through the above-described titration process.

In the event one chooses to determine the appropriate amount of amphiphile(s) in a more systematic approach, the first step involves the construction of a phase diagram to represent the combination of the water-insoluble organic compound and water. More specifically, a phase diagram is constructed by combining water and the water-insoluble organic compound(s) in various proportions, titrating each mixture against the amphiphile(s) until a clear, single-phase region is determined within the phase diagram. By further titrating beyond the clear point, other regions of multi-phase or semi-solid compositions can be determined. These results, when plotted on a conventional triangular plot, represent a ternary phase diagram. For example, FIG. 1 depicts such a ternary phase diagram for an ink-jet ink composition comprising propylene glycol phenyl ether, sodium xylene sulfonate, and water, wherein Area A represents a milky region having two phases, Area B represents a single-phase isotropic region, and Area C represents a semi-solid region. The single-phase isotropic region (Area B of FIG. 1) indicates compositions of organic compound(s), water, and amphiphile(s) that are most suitable for use in an ink-jet ink composition. Thus, one may select any composition from this single-phase region in the practice of the invention, provided the composition meets any other criteria for the particular ink-jet ink composition.

Similar results are obtained in the following ternary systems: (1) water-sodium salicylate-ethylene glycol phenyl ether; (2) water-sodium salicylate-propylene glycol phenyl ether; (3) water-sodium benzoate-ethylene glycol phenyl ether; and (4) water-sodium benzoate-propylene glycol phenyl ether.

To formulate the present pigment-based ink compositions, the water-miscible components, namely water and amphiphile(s), are first combined to form a stable solution, while the water-insoluble organic compound(s) and appropriately modified pigment(s) are likewise separately combined. Next, the combination of pigment(s) and water-insoluble organic compound(s) are added to the water-miscible components to form a mixture. The mixture is then homogenized, such as by stirring, shaking, or other means of agitation, to form the microemulsion-based ink. Attempts to formulate the ink by merely adding all of the ingredients together would simply take too long to form the microemulsion.

Pigment-based ink compositions formulated in accordance with the invention will perform bleed-free; will exhibit fast dry times; and will exhibit the waterfastness inherent to pigments.

INDUSTRIAL APPLICABILITY

The present ink-jet ink compositions and method for controlling bleed as disclosed herein are expected to find commercial use in ink-jet printing.

Thus, there has been disclosed a pigment-based ink-jet ink composition as well as a method of controlling bleed in pigment-based ink-jet ink compositions. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. A pigment-based ink-jet ink composition comprising:
   (a) at least one deagglomerated pigment;
   (b) at least one water-insoluble organic compound;
   (c) at least one amphiphile; and
   (d) water,
wherein said amphiphile is present in an amount sufficient to solubilize said at least one water-insoluble organic compound.

2. The pigment-based ink-jet ink composition of claim 1 wherein said at least one deagglomerated pigment is deagglomerated is by a means selected from the group consisting of encapsulation with a polymer, dispersion with a dispersing agent, and surface modification.

3. The pigment-based ink-jet ink composition of claim 1 wherein said at least one deagglomerated pigment is present in said pigment-based ink-jet ink composition in an amount ranging from about 0.1 to 8 wt %.

4. The pigment-based ink-jet ink composition of claim 1 wherein said at least one deagglomerated pigment has a particle size ranging from about 0.005 to 15 μm.

5. The pigment-based ink-jet ink composition of claim 1 wherein said water-insoluble organic compound is selected from the group consisting of water-insoluble monoglycol ethers, water-insoluble polyglycol ethers, water-insoluble monoglycol phenyl ethers, water-insoluble polyglycol phenyl ethers, water-insoluble N-substituted 2-pyrrolidones, water-insoluble monoglycol esters, water-insoluble polyglycol esters, and water-insoluble hydrocarbons.

6. The pigment-based ink-jet ink composition of claim 5 wherein said at least one water-insoluble organic compound is selected from the group consisting of monoethylene glycol phenyl ethers, polyethylene glycol phenyl ethers, monopropylene glycol phenyl ethers, polypropylene glycol phenyl ethers, ethylene glycol esters, propylene glycol esters, polyethylene glycol esters, polypropylene glycol esters, toluene, xylenes, naphthalene, and phenanthrene.

7. The pigment-based ink-jet ink composition of claim 1 wherein said at least one water-insoluble organic compound is present in said ink-jet ink composition in an amount ranging from about 1 to 70 wt %.

8. The pigment-based ink-jet ink composition of claim 1 wherein said at least one amphiphile is a hydrotropic amphiphile.

9. The pigment-based ink-jet ink composition of claim 8 wherein said hydrotropic amphiphile is selected from the group consisting of sodium benzoate, sodium salicylate, sodium benzene sulfonate, sodium benzene disulfonate, sodium toluene sulfonate, sodium xylene sulfonate, sodium cumene sulfonate, sodium cymene sulfonate, sodium cinnamate, para amino benzoic acid hydrochloride, procaine hydrochloride, caffeine, resorcinol and pyrogallol.

10. The pigment-based ink-jet ink composition of claim 1 wherein said at least one water-insoluble organic compound is selected from the group consisting of propylene glycol phenyl ether and ethylene glycol phenyl ether and said at least one amphiphile is selected from the group consisting of sodium xylene sulfonate, sodium salicylate, and sodium benzoate.

11. The pigment-based ink-jet ink composition of claim 1 further comprising up to about 10 wt % of a co-surfactant comprising an alcohol having a carbon chain length ranging from three to eight carbon atoms.

12. A method of reducing bleed in ink-jet printing comprising:
   (a) formulating a pigment-based ink-jet ink composition to comprise:
      (i) at least one deagglomerated pigment,
      (ii) at least one water-insoluble organic compound,
      (iii) at least one amphiphile, and
      (iv) water, wherein said amphiphile is present in an amount sufficient to solubilize said at least one water-insoluble organic compound in said water; and
   (b) printing said pigment-based ink-jet ink composition on a print medium by means of an ink-jet pen, whereupon said pigment-based ink-jet ink composition is substantially bleed-free.

13. The method of claim 12 wherein said at least one deagglomerated pigment is deagglomerated by a means selected from the group consisting of encapsulation of said pigment with a polymer, dispersion of said pigment by a dispersing agent, and surface modification of said pigment.

14. The method of claim 12 wherein said at least one deagglomerated pigment is present in said pigment-based ink-jet ink composition in an amount ranging from about 0.1 to 8 wt %.

15. The method of claim 12 wherein said at least one deagglomerated pigment has a particle size ranging from about 0.005 to 15 μm.

16. The method of claim 12 wherein said water-insoluble organic compound is selected from the group consisting of water-insoluble monoglycol ethers, water-insoluble polyglycol ethers, water-insoluble monoglycol phenyl ethers, water-insoluble polyglycol phenyl ethers, water-insoluble N-substituted 2-pyrrolidones, water-insoluble monoglycol esters, and water-insoluble polyglycol esters, and water-insoluble hydrocarbons.

17. The method of claim 16 wherein said at least one water-insoluble organic compound is selected from the group consisting of monoethylene glycol phenyl ethers, polyethylene glycol phenyl ethers, monopropylene glycol phenyl ethers, polypropylene glycol phenyl ethers, ethylene glycol esters, propylene glycol esters, polyethylene glycol esters, polypropylene glycol esters, toluene, xylenes, naphthalene, and phenanthrene.

18. The method of claim 12 wherein said at least one water-insoluble organic compound is present in said ink-jet ink composition in an amount ranging from about 1 to 70 wt %.

19. The method of claim 12 Wherein said at least one amphiphile is a hydrotropic amphiphile.

20. The method of claim 19 wherein said hydrotropic amphiphile is selected from the group consisting of sodium benzoate, sodium salicylate, sodium benzene sulfonate, sodium benzene disulfonate, sodium toluene sulfonate, sodium xylene sulfonate, sodium cumene sulfonate, sodium cymene sulfonate, sodium cinnamate, para amino benzoic acid hydrochloride, procaine hydrochloride, caffeine, resorcinol and pyrogallol.

21. The method of claim 12 wherein said at least one water-insoluble organic compound is selected from the group consisting of propylene glycol phenyl ether and ethylene glycol phenyl ether and said at least one amphiphile is selected from the group consisting of sodium xylene sulfonate, sodium salicylate, and sodium benzoate.

22. The method of claim 12 wherein said ink-jet ink composition further comprises up to about 10 wt % of a co-surfactant comprising an alcohol having a carbon chain length ranging from three to eight carbon atoms in length.

* * * * *